US012597426B2

(12) United States Patent
Yun et al.

(10) Patent No.: US 12,597,426 B2
(45) Date of Patent: Apr. 7, 2026

(54) METHOD AND SYSTEM FOR GENERATING SYMPATHETIC BACK-CHANNEL SIGNAL

(71) Applicant: ELECTRONICS AND TELECOMMUNICATIONS RESEARCH INSTITUTE, Daejeon (KR)

(72) Inventors: Seung Yun, Daejeon (KR); Seung Hi Kim, Daejeon (KR); Sanghun Kim, Daejeon (KR); Jeonguk Bang, Daejeon (KR); Min Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 290 days.

(21) Appl. No.: 18/488,333

(22) Filed: Oct. 17, 2023

(65) Prior Publication Data

US 2024/0221742 A1       Jul. 4, 2024

(30) Foreign Application Priority Data

Dec. 28, 2022      (KR) ........................ 10-2022-0186600

(51) Int. Cl.
*G10L 15/22*       (2006.01)
*G10L 15/05*       (2013.01)
*G10L 15/26*       (2006.01)
*G10L 25/63*       (2013.01)

(52) U.S. Cl.
CPC .............. *G10L 15/22* (2013.01); *G10L 15/05* (2013.01); *G10L 15/26* (2013.01); *G10L 25/63* (2013.01)

(58) Field of Classification Search
CPC ................................ G10L 15/22; G10L 25/63
See application file for complete search history.

(56)            References Cited

U.S. PATENT DOCUMENTS

| | | | |
|---|---|---|---|
| 7,970,716 B2 | 6/2011 | Shin et al. | |
| 2012/0092440 A1 | 4/2012 | Cho et al. | |
| 2017/0160813 A1* | 6/2017 | Divakaran | .............. G10L 15/22 |
| 2017/0310820 A1* | 10/2017 | Kao | ........................ G10L 25/90 |
| 2019/0206401 A1* | 7/2019 | Liu | ......................... G10L 15/22 |
| 2023/0230303 A1* | 7/2023 | Yang | ........................ G06N 3/02 |
| | | | 345/419 |

FOREIGN PATENT DOCUMENTS

| | | |
|---|---|---|
| KR | 10-2020-0143764 A | 12/2020 |
| KR | 10-2022-0094008 A | 7/2022 |

* cited by examiner

*Primary Examiner* — Jialong He
(74) *Attorney, Agent, or Firm* — LRK PATENT LAW FIRM

(57)            ABSTRACT

A method of generating a sympathetic back-channel signal is provided. The method includes receiving a voice signal from a user, determining whether predetermined timing is timing at which a back-channel signal is output in response to the input of the voice signal at the predetermined timing, storing the voice signal that has been input so far if the predetermined timing is the timing at which the back-channel signal is output as a result of the determination, determining back-channel signal information based on the stored voice signal, and outputting the determined back-channel signal information.

11 Claims, 6 Drawing Sheets

RECEIVE DETERMINED
BACK-CHANNEL SIGNAL INFORMATION    S151

OUTPUT DETERMINED
BACK-CHANNEL SIGNAL INFORMATION    S152

METHOD AND SYSTEM FOR GENERATING SYMPATHETIC BACK-CHANNEL SIGNAL

CROSS-REFERENCE TO RELATED APPLICATION

This application claims priority to and the benefit of Korean Patent Application No. 10-2022-0186600, filed on Dec. 28, 2022, the disclosure of which is incorporated herein by reference in its entirety.

BACKGROUND

1. Technical Field

The present disclosure relates to a method and system for generating a sympathetic back-channel signal.

2. Description of Related Art

A back-channel signal refers to short voice, a facial expression, an eye gesture, or a head movement or a combination of them that is used by a listener, in order for the listener to indicate that the listener gives his or her attention to a speaker or to request the speaker to continuously talk. In general, in conversations between persons, a back-channel signal is periodically delivered to a counterpart speaker depending on a style of a listener.

Recently, with the development of the artificial intelligence technology, technologies related to a digital human, an intelligence robot, and a voice avatar chatbot are widely spread. The digital human, the intelligence robot, and the voice avatar chatbot are present as physical appearances, such as a character through a screen, in addition to simply exchanging only conversations with a user. Accordingly, natural conversations can be performed only when a system delivers a back-channel signal to a user as a listener like an actual human listener when the user speaks. Furthermore, in this case, natural conversations are possible only when the system generates a back-channel signal and performs conversations in the state in which the system has been sympathetic with emotions of the speaker.

However, today, most of a digital human, an intelligence robot, and a voice avatar chatbot do not deliver back-channel signals, and simply perform only conversations through voice synthesis in a way that a corresponding character has a fixed appearance or performs only the repetition of a simple operation.

SUMMARY

Various embodiments are directed to providing a method and system for generating a sympathetic back-channel signal, which determine timing at which a back-channel signal is generated and output based on image or voice information that is input by a user so that the user can have a more natural conversation with an artificial intelligence conversation system.

However, objects of the present disclosure to be achieved are not limited to the aforementioned object, and other objects may be present.

A method of generating a sympathetic back-channel signal according to a first aspect of the present disclosure includes receiving a voice signal from a user, determining whether predetermined timing is timing at which a back-channel signal is output in response to the input of the voice signal at the predetermined timing, storing the voice signal that has been input so far if the predetermined timing is the timing at which the back-channel signal is output as a result of the determination, determining back-channel signal information based on the stored voice signal, and outputting the determined back-channel signal information.

Furthermore, a system for generating a sympathetic back-channel signal according to a second aspect of the present disclosure includes an input unit configured to receive a voice signal from a user, memory in which a program for generating a sympathetic back-channel signal by analyzing the voice signal is stored, a processor configured to store a voice signal that has been input so far when determining that predetermined timing is timing at which a back-channel signal is output in response to the input of the voice signal at the predetermined timing and to determine back-channel signal information based on the stored voice signal, and an output unit configured to output the determined back-channel signal information.

A computer program for achieving the objects according to another aspect of the present disclosure executes the method of generating a sympathetic back-channel signal in combination with a computer, that is, hardware, and is stored in a computer-readable recording medium.

Other details of the present disclosure are included in the detailed description and the drawings.

According to the aforementioned embodiment of the present disclosure, upon conversation using an artificial intelligence conversation system, the naturality and immersion level of the conversation system can be maximized by outputting sympathetic back-channel signal information along with response information unlike in a conventional technology in which only the response information is simply output.

Furthermore, if the usage of image information is possible, the accuracy of a process of determining timing at which a back-channel signal is output and determining back-channel signal information can be increased by using image information in addition to input voice and text information.

Furthermore, it is possible to minimize dependency on a device, to reduce the possibility that an error occurs in a conversation system, and to improve the naturality of the conversation system because the conversation system is constructed to output back-channel signal information through only image information and to simultaneously output voice and image information as back-channel signal information.

According to an embodiment of the present disclosure, a natural artificial intelligence conversation system that looks like having a conversation with a human being by generating and providing such sympathetic back-channel signal information can be constructed.

Effects of the present disclosure which may be obtained in the present disclosure are not limited to the aforementioned effects, and other effects not described above may be evidently understood by a person having ordinary knowledge in the art to which the present disclosure pertains from the following description.

DETAILED DESCRIPTION

Figure 1:
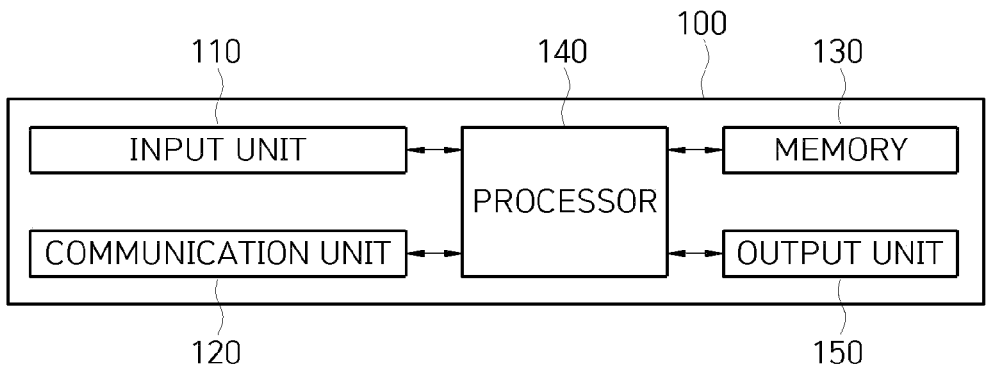
FIG. 1 is a block diagram of a system for generating a sympathetic back-channel signal according to an embodiment of the present disclosure.

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Hereinafter, embodiments of the present disclosure are described in detail with reference to the accompany drawings.

FIG. 1 is a block diagram of a system 100 for generating a sympathetic back-channel signal according to an embodiment of the present disclosure.

The system 100 for generating a sympathetic back-channel signal according to an embodiment of the present disclosure includes an input unit 110, a communication unit 120, memory 130, a processor 140, and an output unit 150.

The input unit 110 includes a microphone for receiving a voice signal from a user. In addition, the input unit 110 may generate input data in response to a user input to the system 100 for generating a sympathetic back-channel signal. The input unit 110 may include at least one input means, and may include a key board, a key pad, a dome switch, a touch panel, a touch key, a mouse, and a menu button.

The communication unit 120 performs communication with a device within the system 100 for generating a sympathetic back-channel signal or an external device, such as a user terminal. The communication unit 120 may include both a wired communication module and a wireless communication module. The wired communication module may be implemented by a power line communication device, a telephone line communication device, cable home (MoCA), Ethernet, IEEE1294, an integrated wired home network, or an RS-485 controller. Furthermore, the wireless communication module may be constructed as a module for implementing a function, such as a wireless LAN (WLAN), Bluetooth, an HDR WPAN, UWB, ZigBee, impulse radio, a 60 GHz WPAN, binary-CDMA, a wireless USB technology, a wireless HDMI technology, $5^{th}$ generation (5G) communication, long term evolution-advanced (LTE-A), long term evolution (LTE), or wireless fidelity (Wi-Fi).

The memory 130 stores a program for generating a sympathetic back-channel signal by analyzing a voice signal. In this case, the memory 130 commonly refers to a nonvolatile storage device that continues to retain information stored therein although power is not supplied to the nonvolatile storage device and a volatile storage device. For example, the memory 120 may include NAND flash memory, such as a compact flash (CF) card, a secure digital (SD) card, a memory stick, a solid-state drive (SSD), and a micro SD card, a magnetic computer memory device, such as a hard disk drive (HDD), and an optical disc drive, such as CD-ROM and DVD-ROM.

The processor 140 may control at least one another component (e.g., a hardware or software component) of the system 100 for generating a sympathetic back-channel signal by executing software, such as a program, and may perform various data processing or operations. The processor 140 may use a predetermined and trained artificial intelligence algorithm in order to generate back-channel signal information or determine timing at which a back-channel signal is output.

The output unit 150 outputs determined back-channel signal information. The output unit 150 may output back-channel signal information based on an image, or may output back-channel signal information based on an image and voice. Furthermore, the output unit 150 may also output back-channel signal information based on voice.

In the description of the present disclosure, the system 100 for generating a sympathetic back-channel signal and an artificial intelligence conversation system (not illustrated) are described as being independent constructions, but the present disclosure is essentially not limited thereto. That is, the system 100 for generating a sympathetic back-channel signal and the artificial intelligence conversation system may be implemented in various forms, such as that the system 100 for generating a sympathetic back-channel signal and the artificial intelligence conversation system are constructed within one server computer in the form of separate programs or the system 100 for generating a sympathetic back-channel signal is constructed as a part of the artificial intelligence conversation system.

Hereinafter, a method that is performed by the system 100 for generating a sympathetic back-channel signal according to an embodiment of the present disclosure is described in detail with reference to FIGS. 2 to 7.

Figure 2:
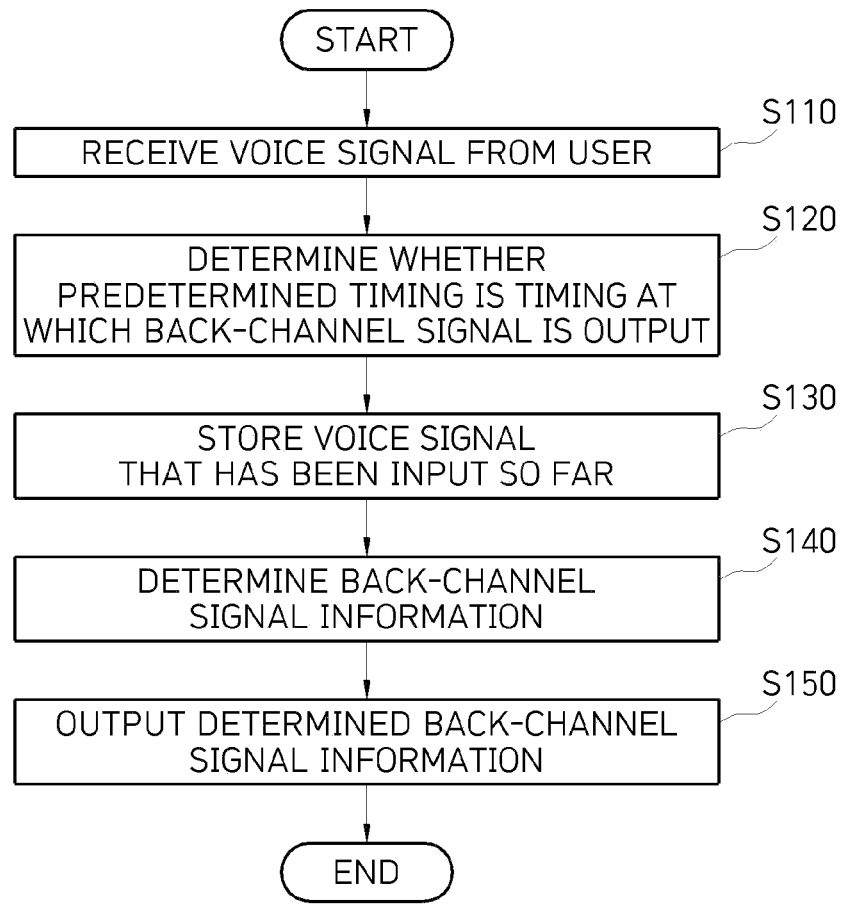
FIG. 2 is a flowchart of a method of generating a sympathetic back-channel signal according to an embodiment of the present disclosure.

FIG. 2 is a flowchart of a method of generating a sympathetic back-channel signal according to an embodiment of the present disclosure.

In an embodiment of the present disclosure, first, the system 100 receives a voice signal from a user through a microphone (S110).

Next, the system 100 determines whether predetermined timing is timing at which a back-channel signal is output when the voice signal is input at the predetermined timing (S120).

When the predetermined timing is the timing at which a back-channel signal is output as a result of the determination, the system 100 stores the voice signal that has been input so far (S130).

The system 100 determines which back-channel signal will be output and back-channel signal information based on the stored voice signal (S140), and outputs the determined back-channel signal information (S150).

In an embodiment of the present disclosure, a back-channel signal, that is, a target, may include an image-based back-channel signal (hereinafter referred to as an "image back-channel signal") and a voice-based back-channel signal (hereinafter referred to as a "voice back-channel signal").

The image back-channel signal is a back-channel signal (representatively nodding a head) that outputs a facial expression, body language, or gesture of a character in a digital human, an intelligence robot, or a voice avatar chatbot. The voice back-channel signal is a back-channel signal that is output through voice synthesis of a corresponding character. Representatively, the voice back-channel signal may correspond to "네", "그랬어요", and "맞아요" in the case of polite expressions and "어", "응", "그래", and "맞아" in the case of normal expressions in Korean, and may correspond to "Um", "Hmm" "Yeah", and "Right" in English, for example.

Embodiments of the present disclosure are described on the basis of an operation using two back-channel signals, that is, an image back-channel signal and a voice and image back-channel signal because an image back-channel signal is output simultaneously with voice even upon voice synthesis.

Figure 3:
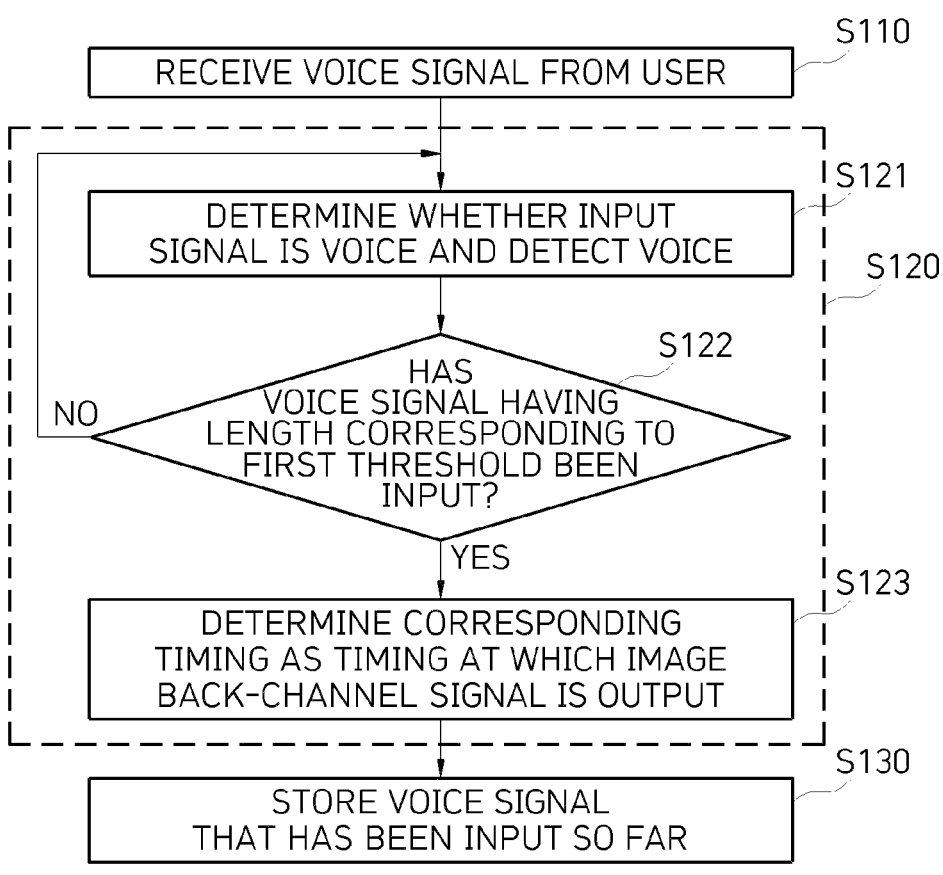
FIG. 3 is a flowchart of a process of determining timing at which an image back-channel signal is output in an embodiment of the present disclosure.

FIG. 3 is a flowchart of a process of determining timing at which an image back-channel signal is output in an embodiment of the present disclosure.

As an embodiment, when receiving a voice signal from a user (S110), the system 100 detects voice by determining whether the input signal is the voice (S121). Furthermore, the system 100 determines whether the voice signal having a length corresponding to a predetermined first threshold has been input (S122). If the voice signal having the length corresponding to the first threshold has been input as a result of the determination (Yes in S122), the system 100 may determine corresponding timing as timing at which an image back-channel signal is output (S123), and stores the voice signals that have been input up to current timing (S130). In this case, if an image signal photographed by a camera is present, the system 100 may also store the image signal.

In this case, the length corresponding to the predetermined first threshold may be determined as a fixed time length (e.g., 3 seconds or 5 seconds), or may be determined as a time length that is varied based on a persona of an artificial intelligence character or reaction information of a user.

As described above, in an embodiment of the present disclosure, a back-channel signal can be periodically transmitted as in conversations between persons through a process of determining timing at which an image back-channel signal is output.

In this process, whether the signal that is input through the microphone is voice may be determined by using a voice activity detection technology. If a camera is used, voice activity detection performance can be further improved by simultaneously detecting voice based on an image signal including a movement of a mouth shape in order to determine whether the mouth of a user is moved in order to talk.

In addition, in an embodiment of the present disclosure, the first threshold for determining image back-channel output timing may be determined based on the speed at which a voice signal of a user is input. For example, if an initial first threshold has been set to fixed 3 seconds, image back-channel output timing is reached after the 3 seconds. At this time, information that evaluates whether the corresponding timing is proper image back-channel output timing by directly receiving feedback information from a user may be received, or whether the corresponding timing is proper image back-channel output timing may be evaluated by generating the feedback information based on results that are obtained by analyzing an image and voice of the user. A length corresponding to the first threshold that has been initially set may be increased or decreased based on such feedback information. Optimized image back-channel output timing may be determined as such an increase or decrease is repeatedly performed multiple times.

Furthermore, in an embodiment of the present disclosure, after first image back-channel output timing is determined based on voice signals that have been stored for a predetermine time interval, second image back-channel output timing is determined based on voice signals that have been stored for a next time interval on the basis of the first image back-channel output timing. In this process, the second image back-channel output timing that is expected in the next time interval may be estimated based on the voice signals that have been previously accumulated and stored, simultaneously with the determination of the first image back-channel output timing. Furthermore, a weight may be assigned to an algorithm for determining image back-channel output timing based on similarity or a confirmity degree by comparing actual second image back-channel output timing and the estimated second image back-channel output timing. In this case, the weight may be a weight for increasing and decreasing a time interval for receiving a voice signal. As such a weight-based learning process is performed multiple times, image back-channel output timing can be determined more accurately.

Figure 4:
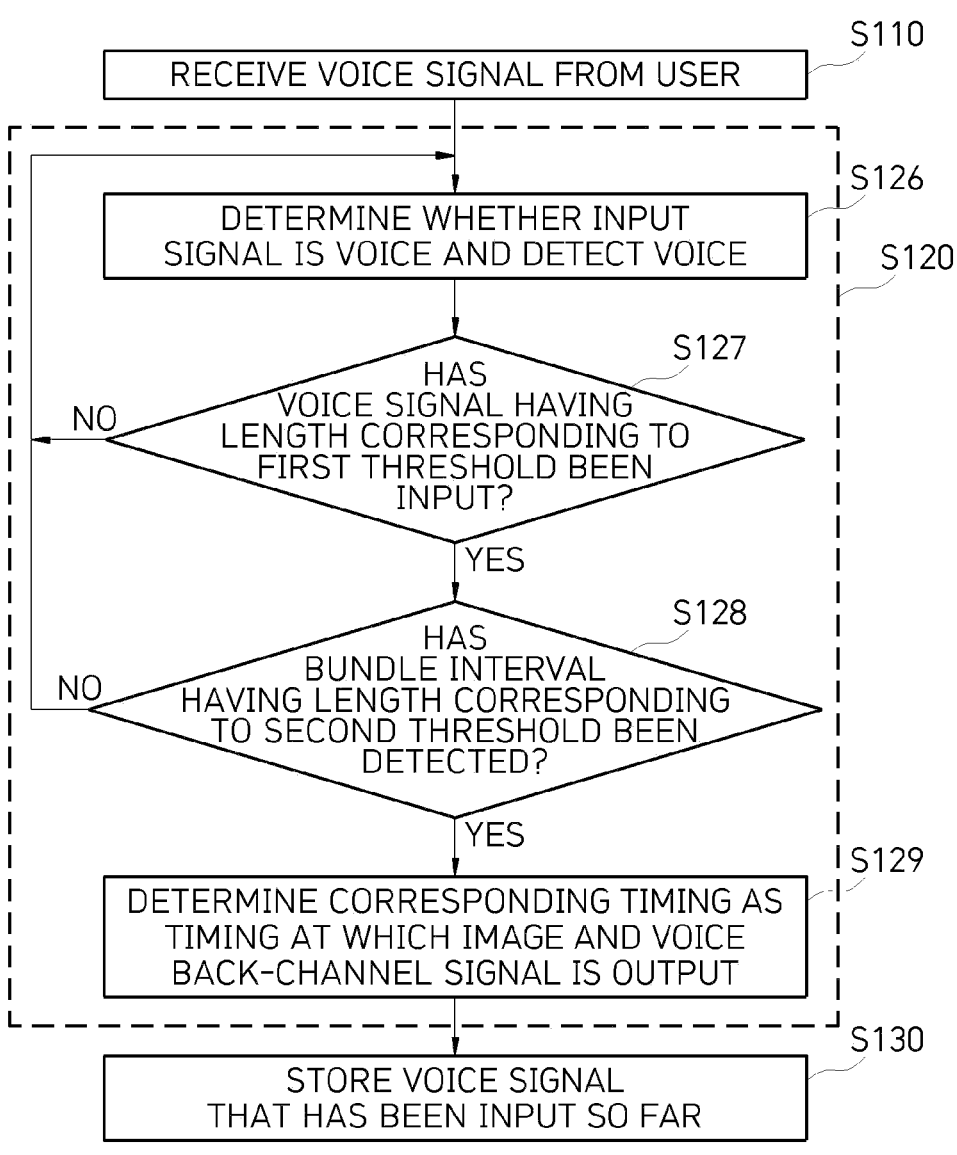
FIG. 4 is a flowchart of a process of determining timing at which an image and voice back-channel signal is output in an embodiment of the present disclosure.

FIG. 4 is a flowchart of a process of determining timing at which an image and voice back-channel signal is output in an embodiment of the present disclosure.

As in the embodiment of FIG. 3, when receiving a voice signal from a user (S110), the system 100 detects voice by determining whether the input signal is the voice (S126). Furthermore, the system 100 determines whether the voice signal having a length corresponding to a predetermined first threshold has been input (S127). If the voice signal having the length corresponding to the first threshold has been input as a result of the determination (Yes in S127), the system 100 determines whether a bundle interval having a length corresponding to a predetermined second threshold has been detected after the voice signal having the length corresponding to the first threshold is input (S128). If the bundle interval corresponding to the second threshold has been detected as a result of the determination (Yes in S128), the system 100 may determine timing at which the bundle interval having the length corresponding to the second threshold has been detected as timing at which an image and voice back-channel signal is output (S129), and stores the voice signal that have been input up to current timing (S130). In this case, if an image signal photographed through a camera is present, the system 100 may also store the image signal.

In the case of the embodiment of FIG. 4, the timing at which the bundle interval is detected may be determined as the timing at which the image and voice back-channel signal is output only when the bundle interval is subsequently detected after the voice signal input. Accordingly, in the embodiment of the embodiment of FIG. 4, the first threshold that is shorter than the first threshold at the timing at which the image back-channel signal is output in the embodiment of FIG. 3 can be applied.

Furthermore, the second threshold for determining whether the bundle interval is sufficiently detected may be determined as a fixed time length (e.g., 0.5 second), or may be determined as a varied time length based on a persona of an artificial intelligence character or reaction information of a user.

In an embodiment of the present disclosure, in determining timing at which an image and voice back-channel signal is output, the bundle interval is detected and used in order to set back-channel output timing as a bundle interval during which a user finishes his or her talk or takes a break because a voice signal also needs to be output as a back-channel signal along with an image back-channel signal.

Likewise, even in the embodiment of FIG. 4, whether the signal that is input through the microphone is voice may be determined by using the voice activity detection technology. If a camera is used, voice activity detection performance can be further improved by simultaneously detecting voice based on an image signal including a movement of a mouth shape in order to determine whether the mouth of a user is moved in order to talk.

Figure 5:
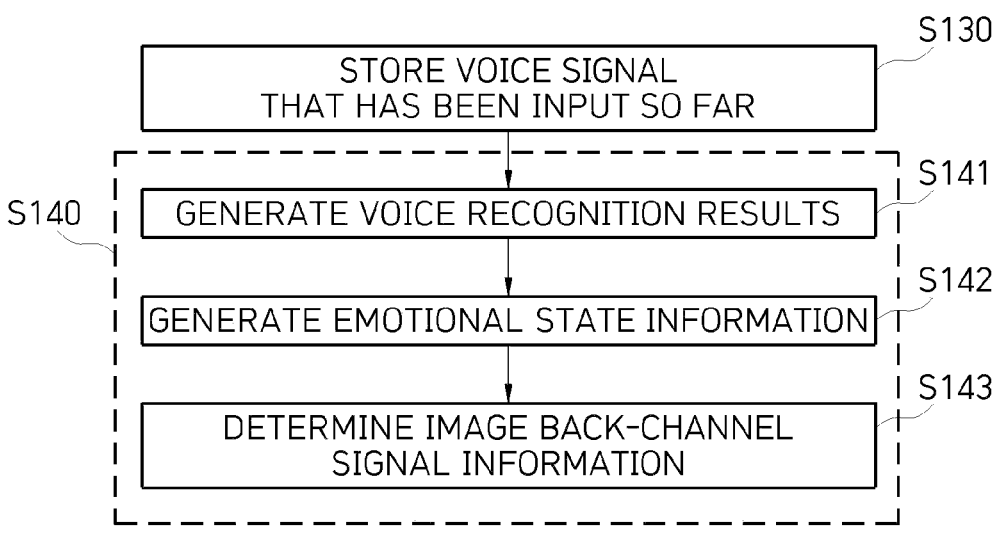
FIG. 5 is a flowchart of a process of determining image back-channel signal information in an embodiment of the present disclosure.

FIG. 5 is a flowchart of a process of determining image back-channel signal information in an embodiment of the present disclosure.

As an embodiment, in step S140 of determining image back-channel signal information, first, the system 100 generates voice recognition results (S141) by performing the voice recognition on a stored voice signal (S130).

Thereafter, the system 100 generates emotional state information of a user based on the stored voice signal and the voice recognition results (i.e., text) (S142). In this case, if a camera is included in the system 100, the system 100 may generate the emotional state information by additionally performing a process of analyzing an image signal. In this case, if emotional recognition results that are input from all modalities are the same, the system 100 may apply the emotional recognition results as the emotional state information without any change. In contrast, if incompatible emotional recognition results are present in modalities, the system 100 may apply emotional recognition results that are output from more modalities as the emotional state information. Alternatively, the system 100 may calculate the reliability or strength of emotional recognition results in each modality, and may apply the emotional recognition results of a modality having the highest reliability or strength as the emotional state information by synthesizing the calculated reliability or strength. The number of modalities may be a voice signal having a predetermined unit or the number of unit image signals.

If it is difficult to determine the emotional state information despite such a method, the system 100 may determine the emotional state information as "Neutral" results.

Next, the system 100 determines image back-channel signal information corresponding to the emotional state information (S143).

The emotional state information includes "Neutral", "Happiness", "Sad", and "Angry", for example, and the classification thereof may be enlarged or changed depending on its analysis methodology. If emotional state information of a user is "Neutral", the system 100 determines image back-channel signal information as an image back-channel signal corresponding to "Neutral". Alternatively, if the emotional state information of the user is "Happiness", the system 100 determines the image back-channel signal information as an image back-channel signal corresponding to "Happiness" or "Joy". If the emotional state information of the user is "Sad" or "Angry", the system 100 determines that an image back-channel signal corresponding to "Consolation" is output.

The determined image back-channel signal information may be constructed in a type in which image back-channel signal information corresponding to an emotion recognition range is mapped after the emotion recognition range which may be first input is set. When the image back-channel signal information is actually mapped, an image signal, such as an expression, a gesture, or a behavior which may be output, needs to be considered in a device, such as a screen.

Figure 6:
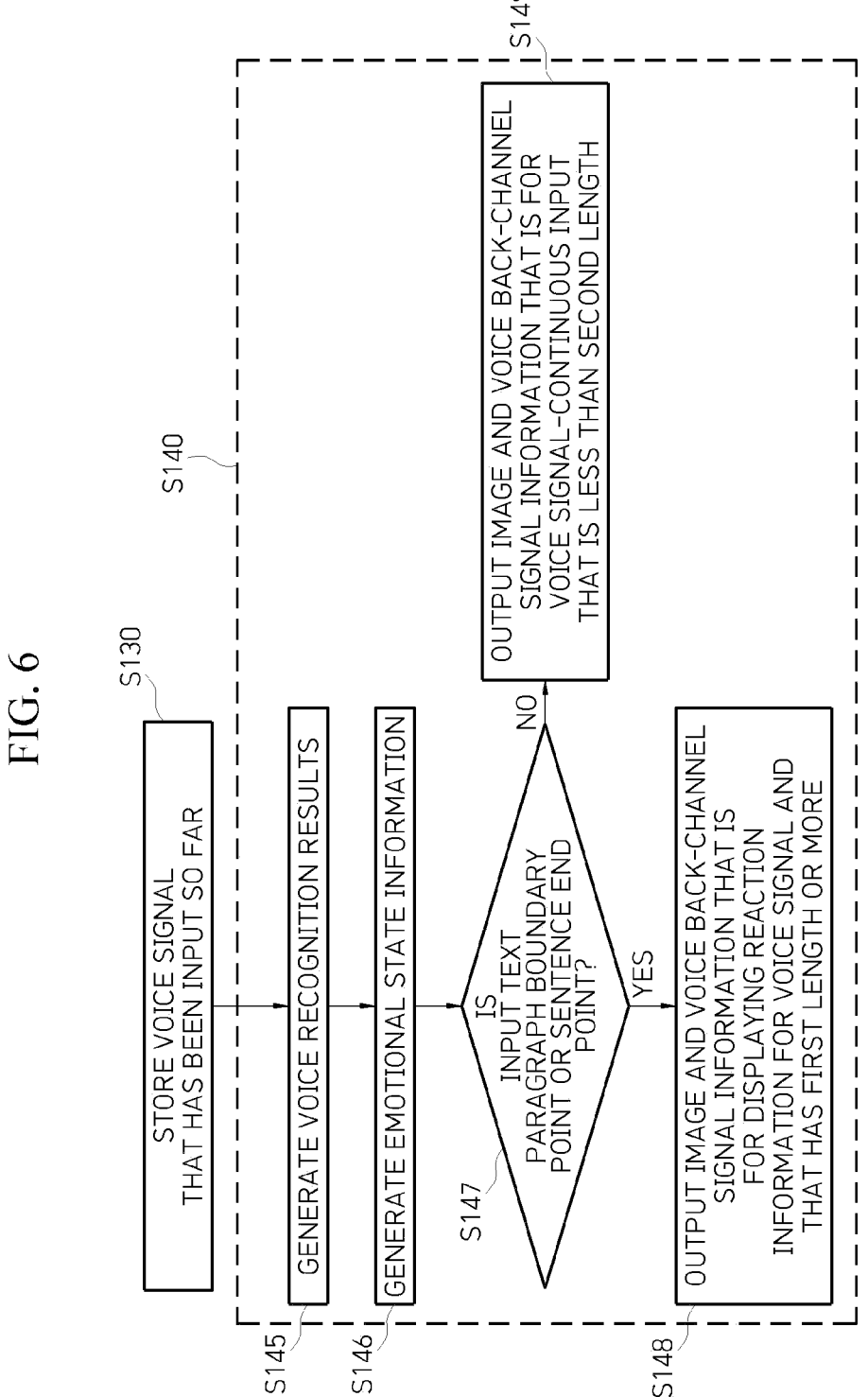
FIG. 6 is a flowchart of a process of determining mage and voice back-channel signal information in an embodiment of the present disclosure.

FIG. 6 is a flowchart of a process of determining image and voice back-channel signal information in an embodiment of the present disclosure.

As an embodiment, in step S140 of determining image and voice back-channel signal information, as in the embodiment of FIG. 5, first, the system 100 generates voice recognition results (S145) by performing voice recognition on a stored voice signal (S130).

Thereafter, the system 100 generates emotional state information of a user based on the stored voice signal and the voice recognition results (i.e., text) (S146). In this case, if a camera is included in the system 100, the system 100 may generate the emotional state information by additionally performing a process of analyzing an image signal. In this case, if emotional recognition results that are input from all modalities are the same, the system 100 may apply the emotional recognition results as the emotional state information without any change. In contrast, if incompatible emotional recognition results are present in modalities, the system 100 may apply emotional recognition results that are output from more modalities as the emotional state information. Alternatively, the system 100 may calculate the reliability or strength of emotional recognition results in each modality, and may apply the emotional recognition results of a modality having the highest reliability or strength as the emotional state information by synthesizing the calculated reliability or strength. The number of modalities may be a voice signal having a predetermined unit or the number of unit image signals.

If it is difficult to determine the emotional state information despite such a method, the system 100 may determine the emotional state information as "Neutral" results.

When the generation of the emotional state information is completed, the system 100 determines whether text according to the voice recognition results is a paragraph boundary point or a sentence end point (S147).

If, as a result of the determination, the text according to the voice recognition results is the paragraph boundary point or the sentence end point (Yes in S147), the system 100 may output back-channel signal information that is for displaying reaction information for the stored voice signal and that has a predetermined first length or more (S148). This is for outputting a back-channel signal having a long length, such as "네" or "응", or "그랬어요" or "맞아요" in Korean, which means "understanding" or "agreement", at the end of a sentence or at the boundary of a paragraph.

In contrast, if, as a result of the determination, the text according to the voice recognition results is not a paragraph boundary point or a sentence end point (No in S147), the system 100 may output back-channel signal information that is for continuously receiving a voice signal from the user and that is less than a predetermined second length shorter than the first length (S149). The back-channel signal itself that is applied in this case is a signal that encourages the user to continuously perform a conversation in the state which the initiative in the conversation is not brought from the user. When outputting a voice back-channel signal, the system 100 may output a back-channel signal having a short length, such as "네" or "어" in Korean, which means "Continue" in the middle of a sentence.

In an embodiment of the present disclosure, two voice back-channel signals, that is, the "Continue" back-channel signal information and the "Understanding" back-channel signal information, have been described as being determined as an example, but the present disclosure is not essentially limited thereto. That is, voice back-channel signal information capable of extracting meaning analysis information for voice recognition results and determining "Surprise" or "Confirm" based on the meaning analysis information may be added.

Furthermore, in the construction of the artificial intelligence conversation system, back-channel signal information and a response from an actual conversation system may be simultaneously output. Which one of the back-channel signal information and the response will be preferentially output or whether the back-channel signal information and the response will be simultaneously output is determined depending on the policy of a conversation system.

Furthermore, in an embodiment of the present disclosure, when a voice back-channel signal is determined, an image back-channel signal may also be determined by using emotional state information.

As in the embodiment of FIG. 5, the emotional state information includes "Neutral", "Happiness", "Sad", and "Angry", for example, and the classification thereof may be enlarged or changed depending on its analysis methodology. If emotional state information of a user is "Neutral", the system 100 determines image back-channel signal information as an image back-channel signal corresponding to "Neutral". Alternatively, if the emotional state information of the user is "Happiness", the system 100 determines the image back-channel signal information as an image back-channel signal corresponding to "Happiness" or "Joy". If the emotional state information of the user is "Sad" or "Angry", the system 100 determines that an image back-channel signal corresponding to "Consolation" is output.

The determined image back-channel signal information may be constructed in a type in which image back-channel signal information corresponding to an emotion recognition range is mapped after the emotion recognition range which may be first input is set. When the image back-channel signal information is actually mapped, an image signal, such as an expression, a gesture, or a behavior which may be output, needs to be considered in a device, such as a screen.

Figure 7:
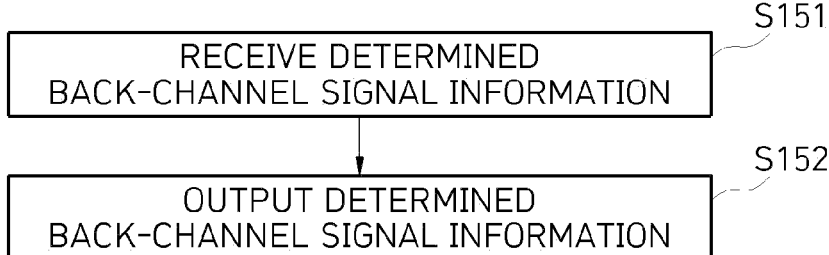
FIG. 7 is a diagram for describing a process of outputting back-channel signal information in an embodiment of the present disclosure.

FIG. 7 is a diagram for describing a process of outputting back-channel signal information in an embodiment of the present disclosure.

As an embodiment, when back-channel signal information is determined, the system 100 outputs the determined back-channel signal information (S151 and S152). When actually outputting the back-channel signal information, the system 100 transmits determined image back-channel signal information to a display area of the output unit 150 so that basic head nodding, expression, gesture, or behavior can be output in accordance with the determined image back-channel signal information.

For example, when image back-channel signal information corresponding to "Neutral" is determined, the system 100 outputs the determined image back-channel signal information so that a character performs a facial expression, a gesture, or an eye movement having a basis state while nodding its head.

Alternatively, when image back-channel signal information corresponding to "Happiness" is determined, the system 100 outputs the determined image back-channel signal information so that a character performs a happy facial expression, gesture, or eye movement while nodding its head.

Alternatively, when image back-channel signal information corresponding to "Consolation" is determined, the system 100 outputs the determined image back-channel signal information so that a character performs a facial expression, a gesture, or an eye movement that shows sorrow or sympathy with a speaker while nodding its head.

In this case, in an embodiment of the present disclosure, the image back-channel signal of a character may be output in various ways depending on a shape of the character or the policy of the artificial intelligence conversation system.

If voice and image back-channel signal information is output, the image back-channel signal information may be output in the same manner. Furthermore, if the voice back-channel signal information is back-channel signal information for inducing a voice signal from a user to be "Continuously" input, "네" or "응" in Korean is output in the form of a rising intonation having a short length. Furthermore, if the voice back-channel signal information is back-channel signal information for showing reaction information (e.g., "Understanding") with respect to a voice signal from a user, "네", "응", "그래", or "맞아" in Korean is output in the form of a descending intonation having a relatively long length.

Furthermore, if the system for generating a sympathetic back-channel signal according to an embodiment of the present disclosure further includes a voice synthesizer capable of emotion expressions, analyzed emotional state information is incorporated so that voice into which a corresponding emotion has been incorporated can be synthesized through the voice synthesizer. The contents themselves of voice text that is output through the voice synthesizer may be randomly output by incorporating a style of a character and a character of the artificial intelligence conversation system or may be output based on rules. If data can be sufficiently secured, a method using machine learning based on deep learning is possible.

In the aforementioned description, each of steps S110 to S160 may be further divided into additional steps or the steps may be combined into smaller steps depending on an implementation example of the present disclosure. Furthermore, some of the steps may be omitted, if necessary, and the sequence of the steps may be changed. Furthermore, the contents described with reference to FIG. 1 and the contents described with reference to FIGS. 2 to 7 may be applied to each other.

The aforementioned embodiment of the present disclosure may be implemented in the form of a program (or application) in order to be executed by being combined with a computer, that is, hardware, and may be stored in a medium.

The aforementioned program may include a code coded in a computer language, such as C, C++, JAVA, Ruby, or a machine language which is readable by a processor (CPU) of a computer through a device interface of the computer in order for the computer to read the program and execute the methods implemented as the program. Such a code may include a functional code related to a function, etc., that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred to. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The medium in which the method is stored means a medium that semi-permanently stores data and that is readable by a device, not a medium that stores data for a short moment like a register, a cache, or memory. Specifically, examples of the medium in which the method is stored include a ROM, a RAM, a CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A system for method of generating a sympathetic back-channel signal, comprising:

a microphone;
memory;
an output unit; and
a processor configured to:
receive a voice signal from a user through the microphone;
determine whether the voice signal has a length corresponding to a predetermined first timing threshold;
determine whether a bundle interval having a length corresponding to a predetermined second timing threshold is input after receiving the voice signal that has the length corresponding to the first timing threshold;
determine an output timing for outputting back-channel signal information as a timing at which the bundle interval is input;
store, in the memory, the voice signal input up to the output timing;
determine the back-channel signal information based on the stored voice signal; and
output the determined back-channel signal information through the output unit.

2. The system of claim 1, wherein the processor outputs the back-channel signal information that is generated based on at least one of an image-based back-channel signal information and a voice-based back-channel signal information.

3. The system of claim 1, wherein the length corresponding to the first timing threshold is determined as a fixed time length or determined as a varied time length based on a persona of an artificial intelligence character or reaction information of the user.

4. The system of claim 1, wherein:
the output timing is timing at which an image and voice-based back-channel signal information is output, and
wherein the processor stores, in the memory, the voice signal and an image signal that have been input so far.

5. The system of claim 1, wherein the processor determines the predetermined output timing as timing at which an image-based channel signal information is output when receiving the voice signal having a length corresponding to the first timing threshold.

6. The system of claim 5, wherein the processor determines timing at which a bundle interval having a length corresponding to a predetermined second timing threshold has been detected as timing at which an image and voice-based back-channel signal information is output when receiving the bundle interval having the length corresponding to the second timing threshold, after receiving the voice signal having the length corresponding to the first timing threshold.

7. The system of claim 1, wherein the processor
generates voice recognition results for the stored voice signal,
generates emotional state information of the user based on the stored voice signal and the voice recognition results, and
determines image-based back-channel signal information corresponding to the emotional state information.

8. The system of claim 7, wherein the processor
determines whether text according to the voice recognition results is a paragraph boundary point or a sentence end point, and
outputs voice-based back-channel signal information that is for displaying reaction information for the stored voice signal and that has a predetermined first length or more, along with the image-based back-channel signal information, if the text is a paragraph boundary point or a sentence end point as a result of the determination.

9. A system for generating a sympathetic back-channel signal, comprising:

a microphone;

memory;

an output unit; and a processor configured to:

receive a voice signal from a user through the microphone;

determine whether a predetermined output timing for outputting a back-channel signal has occurred in response to the received voice signal;

store, in the memory, the voice signal received up to the predetermined output timing when the predetermined output timing has occurred;

generate voice recognition results based on the stored voice signal;

determine whether text according to the voice recognition results indicates a paragraph boundary point or a sentence end point; and output back-channel signal information having a predetermined first length or more for displaying reaction information corresponding the stored voice signal when the text indicates the paragraph boundary point or the sentence end point.

10. The system of claim 9, wherein the processor generates emotional state information of the user based on the stored voice signal and the voice recognition results; and determines the back-channel signal information corresponding to the emotional state information.

11. The system of claim 10, wherein the processor outputs the back-channel signal information that is for continuously receiving a voice signal from the user and that is less than a predetermined second length shorter than the first length when the text is not the paragraph boundary point or the sentence end point.

* * * * *